(12) United States Patent
Hashimoto et al.

(10) Patent No.: US 10,113,560 B2
(45) Date of Patent: Oct. 30, 2018

(54) GAS GUIDING DEVICE AND FACILITY INCLUDING THE SAME

(71) Applicant: MITSUBISHI HITACHI POWER SYSTEMS, LTD., Kanagawa (JP)

(72) Inventors: Shinya Hashimoto, Tokyo (JP); Akinori Tanitsuji, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 392 days.

(21) Appl. No.: 14/890,692

(22) PCT Filed: Jun. 20, 2013

(86) PCT No.: PCT/JP2013/066927
§ 371 (c)(1),
(2) Date: Nov. 12, 2015

(87) PCT Pub. No.: WO2014/203368
PCT Pub. Date: Dec. 24, 2014

(65) Prior Publication Data
US 2016/0108930 A1    Apr. 21, 2016

(51) Int. Cl.
*F04D 29/44* (2006.01)
*F04D 29/54* (2006.01)
(Continued)

(52) U.S. Cl.
CPC .......... *F04D 29/541* (2013.01); *F01D 9/047* (2013.01); *F01D 25/28* (2013.01); *F01D 25/30* (2013.01);
(Continued)

(58) Field of Classification Search
None
See application file for complete search history.

(56) References Cited

U.S. PATENT DOCUMENTS 3,313,517 A * 4/1967 Hanschke .............. F01D 25/26
415/101
3,421,446 A * 1/1969 Strscheletzly ...... F04D 29/4273
415/182.1
(Continued)

FOREIGN PATENT DOCUMENTS

CN         1420960        5/2003
CN         1993535        7/2007
(Continued)

OTHER PUBLICATIONS

First Office Action dated Aug. 12, 2016 in corresponding Chinese Application No. 201380076855.6 (with partial English translation).
(Continued)

*Primary Examiner* — Igor Kershteyn
*Assistant Examiner* — Jason Fountain
(74) *Attorney, Agent, or Firm* — Wenderoth, Lind & Ponack, L.L.P.

(57) ABSTRACT

A gas guiding device includes: a first connection part (41) connected at an end of a tubular outer casing (15) in an axial-flow rotary machine and having an annular shape around an axis (Ar); a second connection part (45) connected at an end of a tubular inner casing (16) in the axial-flow rotary machine and having an annular shape around the axis (Ar); a duct main body part (51) forming therein a flow passage (Pa) having an annular shape around the axis (Ar); and a support part (59) supporting the duct main body part (51). The duct main body part (51) is combined with the first connection part (41) and the second connection part (45) to form the annular flow passage (Pa). The first connection part (41) and the second connection part (45) have expansion joints (42), (46), respectively, which have an annular shape around the axis (Ar).

9 Claims, 8 Drawing Sheets

(51) Int. Cl.
*F01D 25/30* (2006.01)
*F02C 7/04* (2006.01)
*F01D 9/04* (2006.01)
*F01D 25/28* (2006.01)
*F04D 29/70* (2006.01)
*F04D 29/60* (2006.01)
*F04D 29/66* (2006.01)

(52) U.S. Cl.
CPC .............. *F02C 7/04* (2013.01); *F04D 29/601* (2013.01); *F04D 29/668* (2013.01); *F04D 29/701* (2013.01); *F05D 2230/642* (2013.01); *F05D 2250/51* (2013.01); *F05D 2260/30* (2013.01)

(56) References Cited

U.S. PATENT DOCUMENTS

| | | | | |
|---|---|---|---|---|
| 8,206,097 | B2 * | 6/2012 | Nagai | F04D 29/522 415/195 |
| 9,291,068 | B2 * | 3/2016 | Roge | F16J 15/021 |

| | | | |
|---|---|---|---|
| 2002/0131862 | A1 | 9/2002 | Sheoran et al. |

FOREIGN PATENT DOCUMENTS

| | | | |
|---|---|---|---|
| JP | 52-147309 | 12/1977 | |
| JP | 5-52235 | 7/1993 | |
| JP | 6-193466 | 7/1994 | |
| JP | 2001-107745 | 4/2001 | |
| JP | 2002-147248 | 5/2002 | |
| JP | 2006-37877 | 2/2006 | |
| JP | 2009-174331 | 8/2009 | |
| WO | WO 2013139782 A1 * | 9/2013 | ............ F16J 15/021 |

OTHER PUBLICATIONS

International Search Report dated Sep. 10, 2013 in corresponding International Application No. PCT/JP2013/066927 (with English Translation).
Written Opinion of the International Searching Authority dated Sep. 10, 2013 in corresponding International Application No. PCT/JP2013/066927 (with English Translation).

* cited by examiner

GAS GUIDING DEVICE AND FACILITY INCLUDING THE SAME

TECHNICAL FIELD

The present invention relates to a gas guiding device which is connected to an axial-flow rotary machine and guides gas between the gas guiding device and the axial-flow rotary machine, and to a facility including this gas guiding device.

BACKGROUND ART

Gas turbines are a type of axial-flow rotary machines. As described in Patent Literature 1, for example, the gas turbine includes a rotating shaft rotating around an axis, an inner casing having an annular shape around the axis, and an outer casing having an annular shape around the axis and forming a gas flow passage between the outer casing and the outer peripheral side of the inner casing. An intake duct is provided on a suction side which is the end in the axial direction of the gas turbine. The intake duct has a flow passage formed therein which has an annular shape around the axis, and an intake opening formed on the radially outside relative to the axis.

The intake duct is connected with the outer casing and the inner casing of the gas turbine, and is supported by this gas turbine in an overhanging state.

CITATION LIST

Patent Literature

Patent Literature 1
Japanese Patent Laid-Open No. 2009-174331

SUMMARY OF INVENTION

Technical Problem

The intake duct described in Patent Literature 1 is supported, in an overhanging state, on the casing of the gas turbine at the end in the axial direction of the gas turbine. This causes a problem with the technique described in Patent Literature 1 in that the natural frequency of the gas turbine decreases and the vibration characteristics of the gas turbine degrade.

Focusing on this problem, the present invention aims to provide a gas guiding device which can improve vibration characteristics of an axial-flow rotary machine while guiding gas between the gas guiding device and the axial-flow rotary machine, and a facility including this gas guiding device.

Solution to Problem

According to one aspect of the present invention for solving the above problem, there is provided a gas guiding device which is connected to an axial-flow rotary machine including a rotating shaft rotating around an axis, an inner casing having a tubular shape around the axis, and an outer casing having a tubular shape around the axis and forming a flow passage for gas between the outer casing and an outer peripheral side of the inner casing, and which guides the gas between the gas guiding device and the axial-flow rotary machine, the gas guiding device including: a first connection part connected at an end of the tubular outer casing and having an annular shape around the axis; a second connection part connected at an end of the tubular inner casing and having an annular shape around the axis; a main body part which is combined with the first connection part and the second connection part to form therein a flow passage having an annular shape around the axis, and has an opening formed on the radially outside relative to the axis; and a support part supporting the main body part, wherein the first connection part has a first joint which has an annular shape around the axis and allows movement of the main body part relative to the outer casing, and the second connection part has a second joint which has an annular shape around the axis and allows movement of the main body part relative to the inner casing.

In this gas guiding device, the main body part is supported by the support part, and this main body part is connected with the casing of the axial-flow rotary machine through the first joint and the second joint which allow movement of the main body part relative to the casing of the axial-flow rotary machine. In this gas guiding device, therefore, the end in the axial direction of the casing of the axial-flow rotary machine is substantially free of the weight of at least the main body part. Accordingly, this gas guiding device can increase the natural frequency of the axial-flow rotary machine and improve the vibration characteristics of the axial-flow rotary machine.

Here, in the gas guiding device, the diameter of the annular first joint and the diameter of the annular second joint may be equal.

In the flow passage of the gas guiding device through which gas passes, the flow velocity is higher and the static pressure is lower in a portion closer to the axis of the rotating shaft of the axial-flow rotary machine than in a portion farther away from the axis. Accordingly, a force acting from the outside toward the inside on a portion of the members forming the gas flow passage in the gas guiding device which is closer to the axis is larger than a force acting from the outside toward the inside on a portion farther away from the axis.

In this gas guiding device, the diameter of the annular first joint and the diameter of the annular second joint are equal. Accordingly, a force acting from the outside toward the inside on a portion from the first joint to the opening of the main body part and a force acting from the outside toward the inside on a portion from the second joint to the opening of the main body part are equal, so that a balance is achieved between the forces acting on these portions. Thus, in this gas guiding device, it is possible to reduce loads applied to the main body part, the support part supporting the main body part, etc.

In any one of the above gas guiding devices, the first joint and the second joint may be both an expansion joint.

In any one of the above gas guiding devices, the opening of the main body part may be open upward, or the opening of the main body part may be open downward. Moreover, the opening of the main body part may be open sideward.

In any one of the above gas guiding devices, the first connection part, the second connection part, and the main body part may constitute an intake duct which is provided on an intake side of the axial-flow rotary machine, while the opening of the main body part may form an intake opening. Alternatively, in any one of the above gas guiding devices, the first connection part, the second connection part, and the main body part may constitute an exhaust duct which is provided on an exhaust side of the axial-flow rotary machine, while the opening of the main body part may form an exhaust opening.

An axial-flow rotary mechanical facility as one aspect according to the present invention for solving the above problem includes any one of the above gas guiding devices and the axial-flow rotary machine.

A gas turbine facility as one aspect according to the present invention for solving the above problem includes any one of the above gas guiding devices and a gas turbine which is the axial-flow rotary machine.

Advantageous Effects of Invention

According to one aspect of the present invention, it is possible to improve vibration characteristics of an axial-flow rotary machine while guiding gas between a gas guiding device and the axial-flow rotary machine.

DESCRIPTION OF EMBODIMENTS

In the following, various embodiments and modified examples of an axial-flow rotary mechanical facility including a gas guiding device and an axial-flow rotary machine according to the present invention will be described in detail with reference to the drawings.

First Embodiment

First, a first embodiment of an axial-flow rotary mechanical facility including a gas guiding device and an axial-flow rotary machine according to the present invention will be described with reference to FIG. 1 to FIG. 5.

Figure 1:
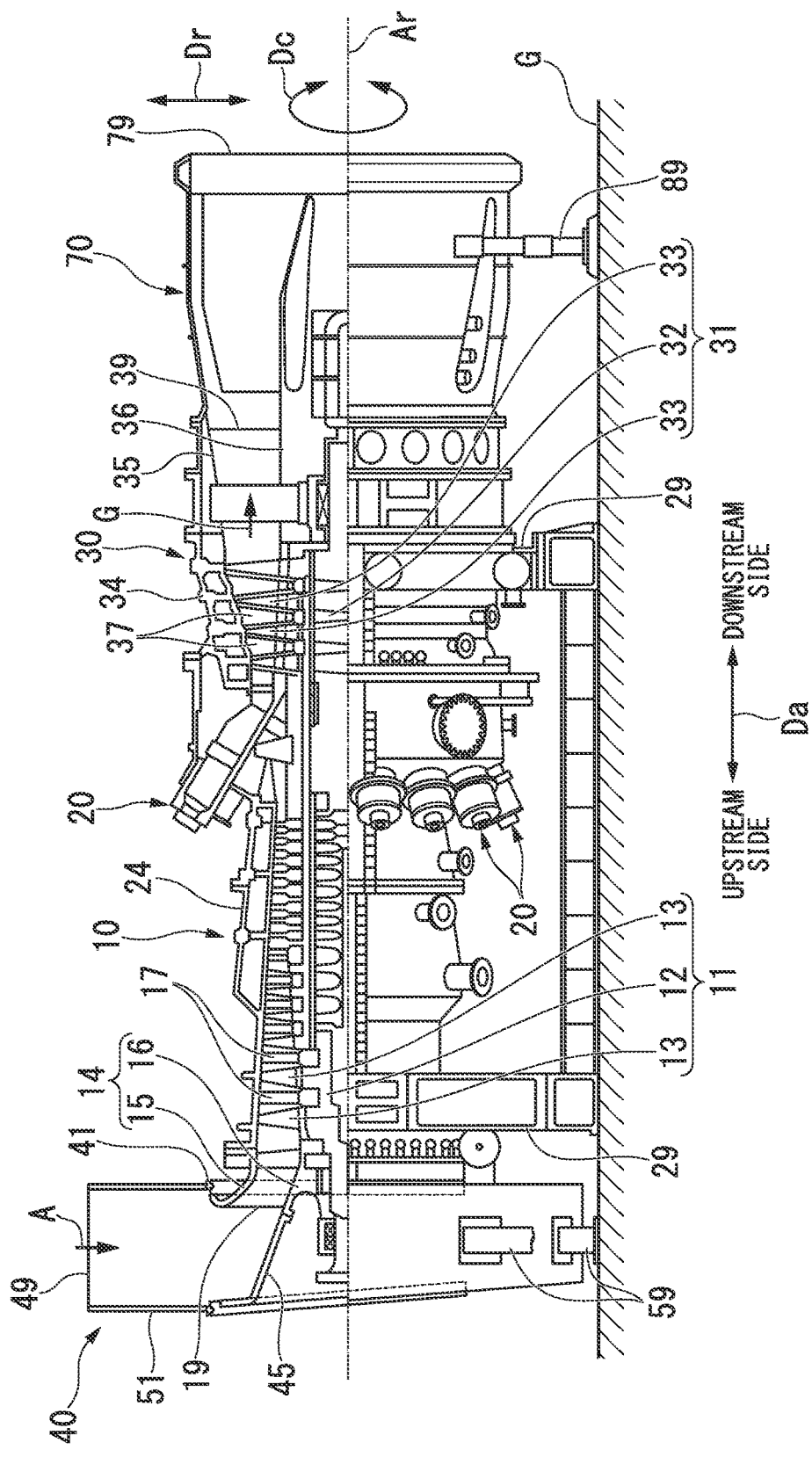
FIG. 1 is a cutaway side view of a major part of a gas turbine facility in a first embodiment according to the present invention.

As shown in FIG. 1, the axial-flow rotary mechanical facility of this embodiment is a gas turbine facility. The gas turbine facility includes an axial-flow compressor 10 (hereinafter referred to simply as a compressor 10) which compresses air A and generates compressed air, an intake duct 40 which guides the air A to a suction opening 19 of this compressor 10, a combustor 20 which mixes fuel from a fuel supply source into the compressed air and combusts the mixture to generate combustion gas, a turbine 30 driven by the combustion gas, and an exhaust duct 70 which guides combustion gas G from the turbine 30 as exhaust gas to the outside. In this embodiment, the gas turbine is composed of the compressor 10, the combustor 20, and the turbine 30, and this gas turbine constitutes the axial-flow rotary machine.

The compressor 10 has a compressor rotor 11 rotating around an axis Ar, and a compressor casing 14 rotatably covering this compressor rotor 11. Hereinafter, the direction in which the axis Ar extends will be referred to as an axial direction Da. The radial direction with reference to the axis Ar will be referred to simply as a radial direction Dr, and the peripheral direction with reference to the axis Ar will be referred to simply as a peripheral direction Dc.

The compressor rotor 11 has a rotating shaft 12 extending in the axial direction Da around the axis Ar, and a plurality of blade rows arrayed in the axial direction Da and mounted on the outer periphery of the rotating shaft 12. The plurality of blade rows each have a plurality of blades 13 arrayed in the peripheral direction Dc and mounted on the outer periphery of the rotating shaft 12.

The compressor casing 14 has an outer casing 15 and an inner casing 16 which have a tubular shape around the axis Ar. The inner casing 16 covers one side in the axial direction Da of the rotating shaft 12. The outer casing 15 covers the compressor rotor 11 almost entirely. The space between the radially inside of the tubular outer casing 15 and the radially outside of the tubular inner casing 16 forms an annular air flow passage. One end in the axial direction Da of this annular air flow passage forms the annular suction opening 19. Hereinafter, one side in the axial direction Da will be referred to simply as the upstream side, and the opposite side will be referred to simply as the downstream side. The space between the radially inside of the tubular outer casing 15 and the radially outside of a portion of the rotating shaft 12 which is not covered with the inner casing 16 forms an annular air flow passage which communicates with the above-mentioned air flow passage. On the inner peripheral surface of the outer casing 15, a plurality of vane rows arrayed in the axial direction Da are mounted. The plurality of vane rows each have a plurality of vanes 17 arrayed in the peripheral direction Dc and mounted on the inner peripheral surface of the outer casing 15.

The turbine 30 has a turbine rotor 31 rotating around the axis Ar, and a turbine casing 34 rotatably covering this turbine rotor 31.

The turbine rotor 31 has a rotating shaft 32 extending in the axial direction Da around the axis Ar, and a plurality of blade rows arrayed in the axial direction Da and mounted on the outer periphery of the rotating shaft 32. The plurality of blade rows each have a plurality of blades 33 arrayed in the peripheral direction Dc and mounted on the outer periphery of the rotating shaft 32. The downstream end of the compressor rotor 11 and the upstream end of the turbine rotor 31 are connected with each other, and these rotors integrally constitute a gas turbine rotor.

The turbine casing 34 has a tubular shape around the axis Ar. The downstream end of the outer casing 15 of the compressor 10 and the upstream end of the turbine casing 34 are connected with each other, and these casings constitute a gas turbine casing 24. This gas turbine casing 24 is supported by gas turbine support legs 29 at a portion on the upstream side and a portion on the downstream side. These gas turbine support legs 29 are fixed on a gas turbine installation surface G. The space between the radially inside of the turbine casing 34 and the radially outside of the rotating shaft 32 in the turbine rotor 31 forms an annular combustion gas flow passage. On the inner peripheral surface of the turbine casing 34, a plurality of vane rows arrayed in the axial direction Da are mounted. The plurality of vane rows each have a plurality of vanes 37 arrayed in the peripheral direction Dc and mounted on the inner peripheral surface of the outer casing 15.

The turbine 30 further includes an outer diffuser (outer casing) 35 and an inner diffuser (inner casing) 36 which have a tubular shape around the axis Ar. Both the outer diffuser 35 and the inner diffuser 36 are disposed in a downstream-side portion of the rotating shaft 32 between the radially inside of the turbine casing 34 and the radially outside of the rotating shaft 32. The space between the radially inside of the tubular outer diffuser 35 and the radially outside of the tubular inner diffuser 36 forms an annular combustion gas flow passage which communicates with the above-mentioned combustion gas flow passage. The downstream end of the annular combustion gas flow passage, which is formed between the radially inside of the tubular outer diffuser 35 and the radially outside of the tubular inner diffuser 36, forms an annular exhaust port 39.

The exhaust duct 70 has a tubular shape around the axis Ar. The tubular exhaust duct 70 has its upstream end connected with the downstream end of the turbine casing 34, the downstream end of the outer diffuser 35, and the downstream end of the inner diffuser 36. An annular exhaust gas flow passage is formed inside the exhaust duct 70. This exhaust gas flow passage forms an exhaust chamber. This exhaust chamber communicates with the combustion gas flow passage of the turbine 30. The downstream end of the exhaust duct 70 forms a circular opening, and this opening forms an exhaust opening 79 through which the combustion gas G as exhaust gas is discharged to the outside. The exhaust duct 70 is supported by exhaust duct support legs 89. These exhaust duct support legs 89 are fixed on the gas turbine installation surface G.

The intake duct 40 has a first connection part 41 connected at the upstream end of the tubular outer casing 15 of the compressor 10, a second connection part 45 connected at the upstream end of the tubular inner casing 16 of the compressor 10, and a duct main body part 51 connected with the first connection part 41 and the second connection part 45.

Figure 2:
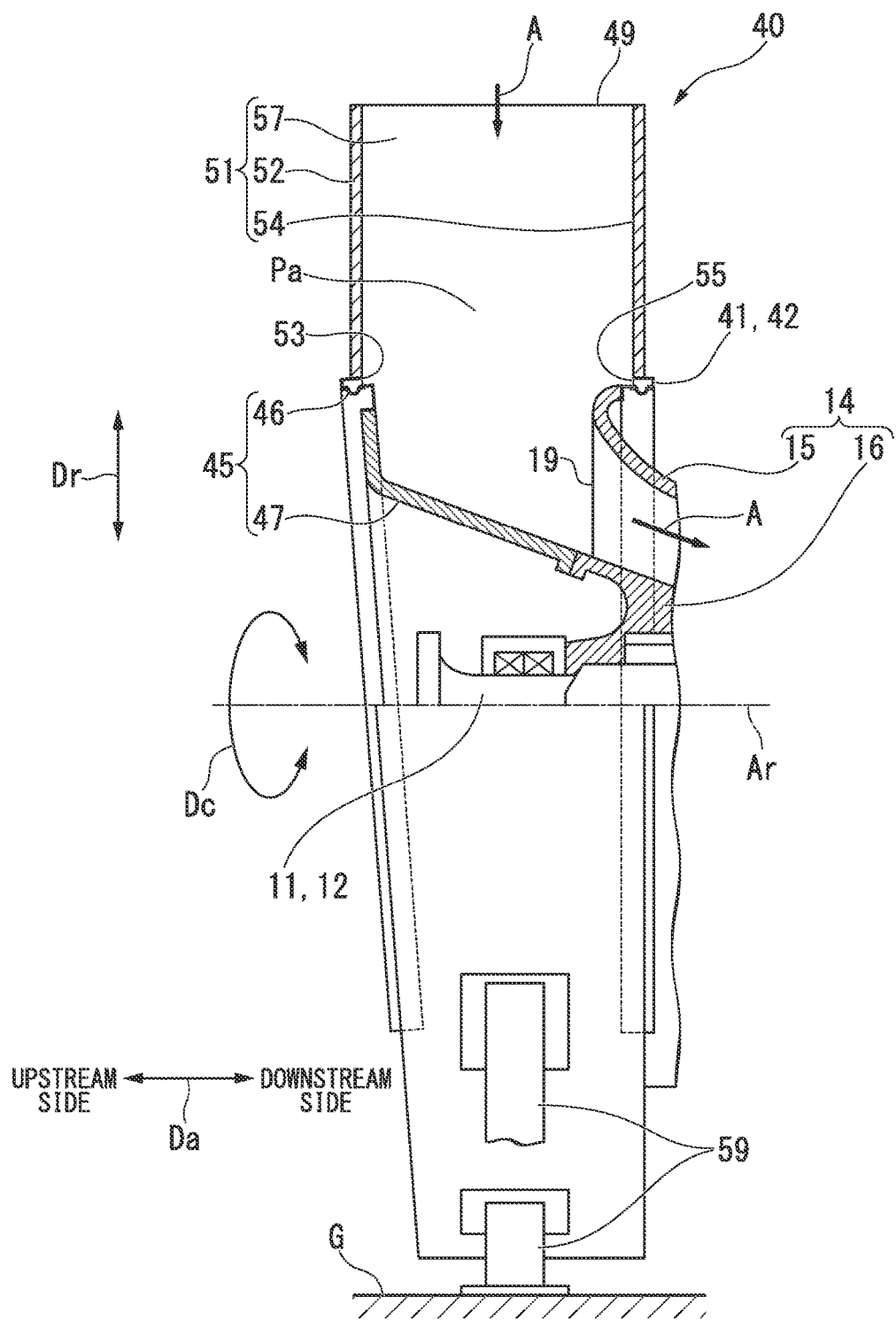
FIG. 2 is a cutaway side view of a major part of an intake duct in the first embodiment according to the present invention.
Figure 3:
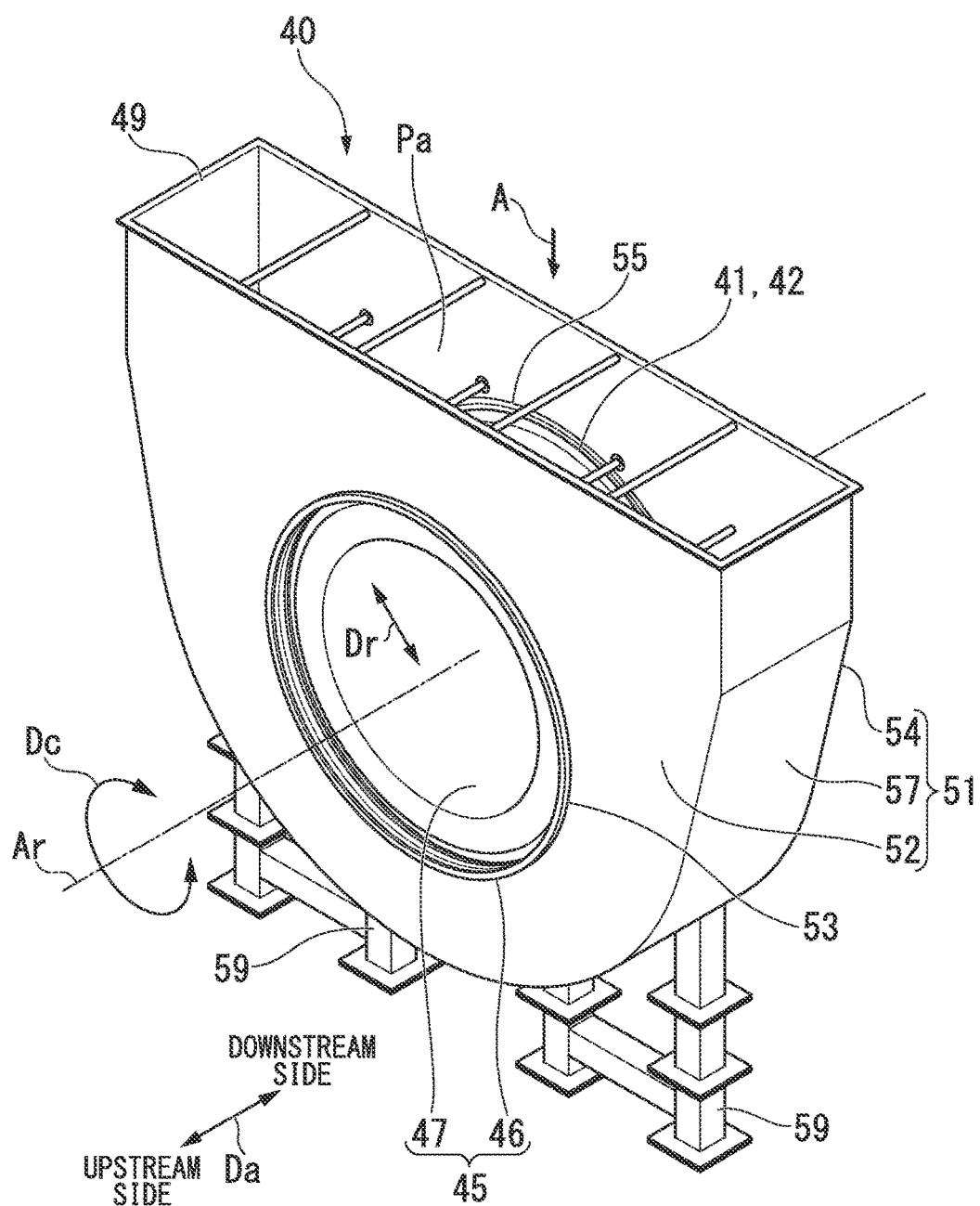
FIG. 3 is a first perspective view of the intake duct and its support legs in the first embodiment according to the present invention.
Figure 4:
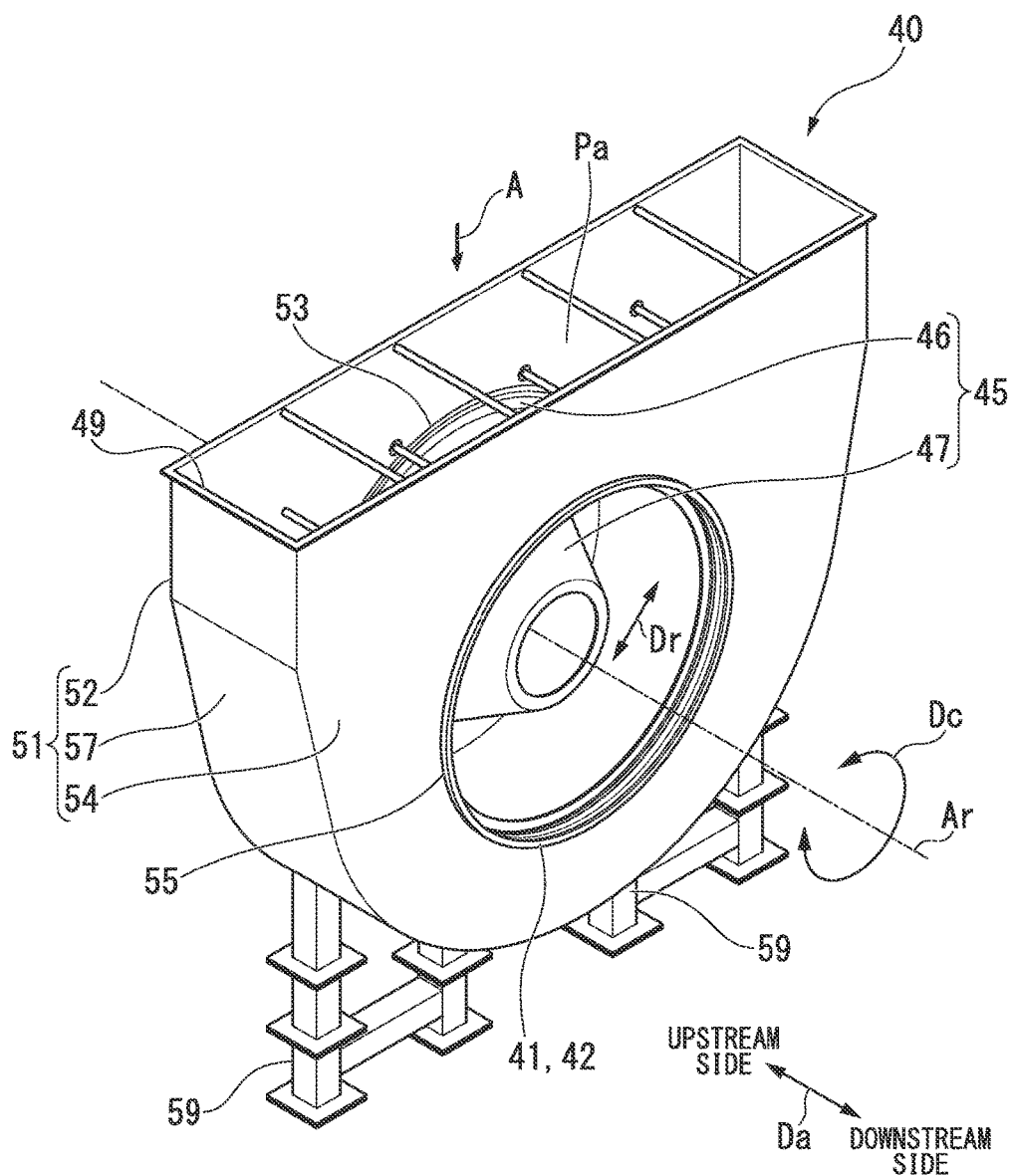
FIG. 4 is a second perspective view of the intake duct and its support legs in the first embodiment according to the present invention.

As shown in FIG. 2 to FIG. 4, both the first connection part 41 and the second connection part 45 have an annular shape around the axis Ar. The duct main body part 51 is combined with the annular first connection part 41 and second connection part 45 to form therein an annular air flow passage Pa. This air flow passage Pa communicates with the air flow passage of the compressor 10. Moreover, this air flow passage Pa forms an intake chamber. On the radially outside of this duct main body part 51, an intake opening 49 which is open upward is formed.

The duct main body part 51 has a front wall plate 52 and a rear wall plate 54 which extend in a direction including a directional component perpendicular to the axis Ar and face each other at a distance in the axial direction Da, and a side wall plate 57 which couples the radially outer edge of the front wall plate 52 and the radially outer edge of the rear wall plate 54 with each other. The front wall plate 52 is located on the upstream side relative to the rear wall plate 54. The upper edges of the radially outer edge of the front wall plate 52 and the radially outer edge of the rear wall plate 54 are not coupled by the side wall plate 57, and the intake opening 49 is formed by these upper edges and the upper edge of the side wall plate 57. Openings 53, 55 which are circular around the axis Ar are formed in the front wall plate 52 and the rear wall plate 54. The diameter of the circular opening 53 of the front wall plate 52 and the diameter of the circular opening 55 of the rear wall plate 54 are substantially equal.

The first connection part 41 has a first expansion joint 42 which has an annular shape around the axis Ar. The second connection part 45 has an inner cylinder 47 which has a tubular shape around the axis Ar and a second expansion joint 46 which is connected at an end of this inner cylinder 47 and has an annular shape around the axis Ar. The diameter of the inner cylinder 47 having a tubular shape around the axis Ar increases gradually toward the upstream side. The downstream end of this tubular inner cylinder 47 is rigidly connected at the upstream end of the inner casing 16. Here, rigid connection refers to a state of two members being integrally connected so that one member is substantially unable to move relative to the other member, as in a case where two members are connected with each other with bolts and nuts, or where two members are connected with each other by welding. The above-mentioned second expansion joint 46 is mounted at the other end of the inner cylinder 47.

Figure 5:
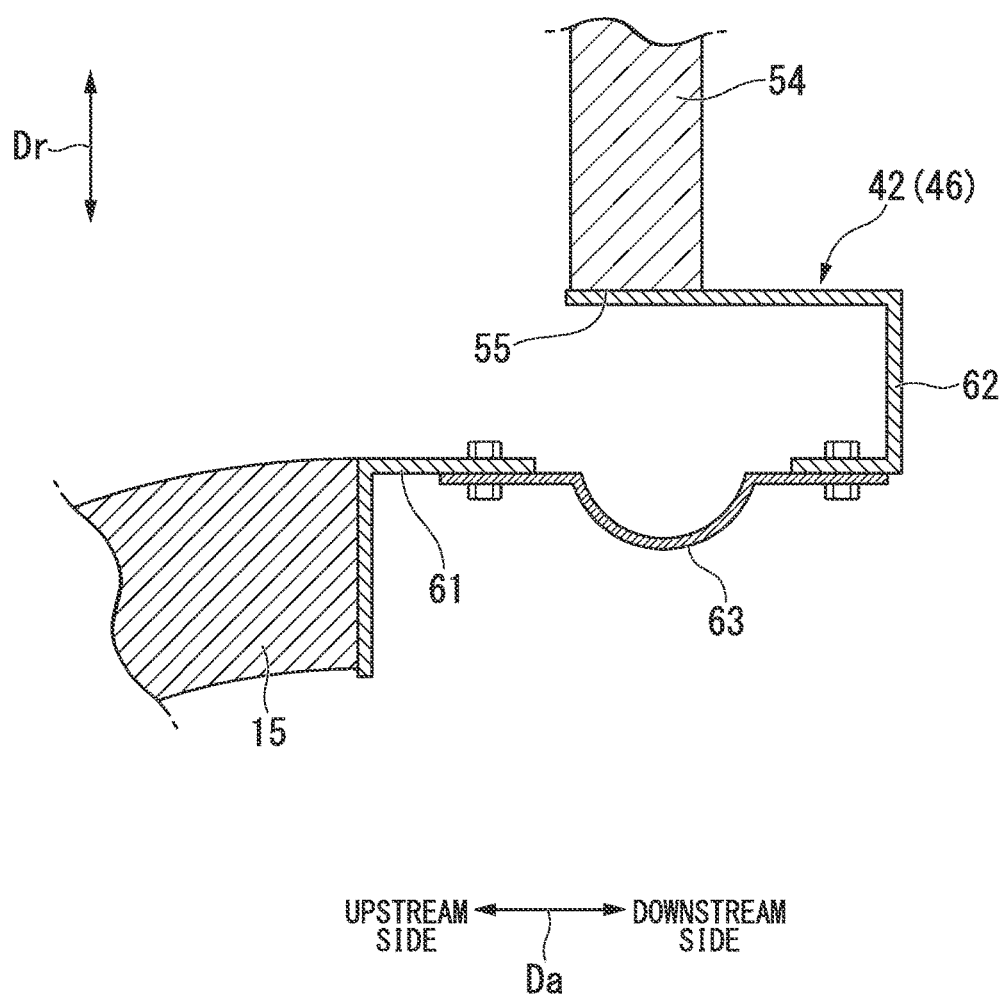
FIG. 5 is a cross-sectional view of an expansion joint in the first embodiment according to the present invention.

As shown in FIG. 5, the first expansion joint 42 and the second expansion joint 46 each have a first frame 61 and a second frame 62 which have an annular shape around the axis Ar and face each other at a distance in the axial direction Da, and a flexible expansion member 63 which has an annular shape around the axis Ar and coupes the first frame 61 and the second frame 62 with each other. Both the first frame 61 and the second frame 62 are formed of rigid metal etc. The expansion member 63 here is formed of a rubber sheet. However, the expansion member 63 may be a bellows formed of resin or metal. The expansion member 63 is coupled with the first frame 61 and the second frame 62 with bolts and nuts etc. Alternatively, the expansion member 63 may be coupled with the first frame 61 and the second frame 62 with an adhesive. If the expansion member 63 is a metal bellows, the expansion member 63 may be coupled with the first frame 61 and the second frame 62 by welding.

While the first frame 61 and the second frame 62 of the first expansion joint 42 and the second expansion joint 46 in this embodiment face each other at a distance in the axial direction Da, these frames may face each other at a distance in the radial direction Dr.

The annular first frame 61 of the first expansion joint 42 is rigidly connected with the outer casing 15 of the compressor 10. The annular second frame 62 of the first expansion joint 42 is rigidly connected at the edge of the circular opening 55 of the rear wall plate 54 in the duct main body part 51. The annular first frame 61 of the second expansion joint 46 is rigidly connected at the other end of the annular second connection part 45. The annular second frame 62 of the second expansion joint 46 is rigidly connected at the edge of the circular opening 53 of the front wall plate 52 in the duct main body part 51.

As described above, the annular first expansion joint 42 is rigidly connected at the edge of the circular opening 55 of the rear wall plate 54 in the duct main body part 51, and the annular second expansion joint 46 is rigidly connected at the edge of the circular opening 53 of the front wall plate 52 in the duct main body part 51. Moreover, as described above, the diameter of the circular opening 55 of the rear wall plate 54 and the diameter of the circular opening 53 of the front wall plate 52 in the duct main body part 51 are substantially equal. Accordingly, in this embodiment, the diameter of the annular first expansion joint 42 and the diameter of the annular second expansion joint 46 are substantially equal.

The duct main body part 51 is supported from below by a plurality of intake duct support legs (support parts) 59. The plurality of intake duct support legs 59 are fixed on the gas turbine installation surface G.

In this embodiment, the gas guiding device is composed of the intake duct 40 and the plurality of intake duct support legs 59 having been described above.

Thus, in this embodiment, the duct main body part 51 of the intake duct 40 is supported by the intake duct support legs 59, and this duct main body part 51 is connected with the compressor casing 14 through the first expansion joint 42 and the second expansion joint 46 which allow movement of the duct main body part 51 relative to the compressor casing 14. In this embodiment, therefore, the end in the axial direction Da of the compressor casing 14 is substantially free of the weight of the duct main body part 51. Accordingly, in this embodiment, the natural frequency of the gas turbine as a whole can be increased, and the vibration characteristics of the gas turbine as a whole can be improved.

First Modified Example of First Embodiment

Figure 6:
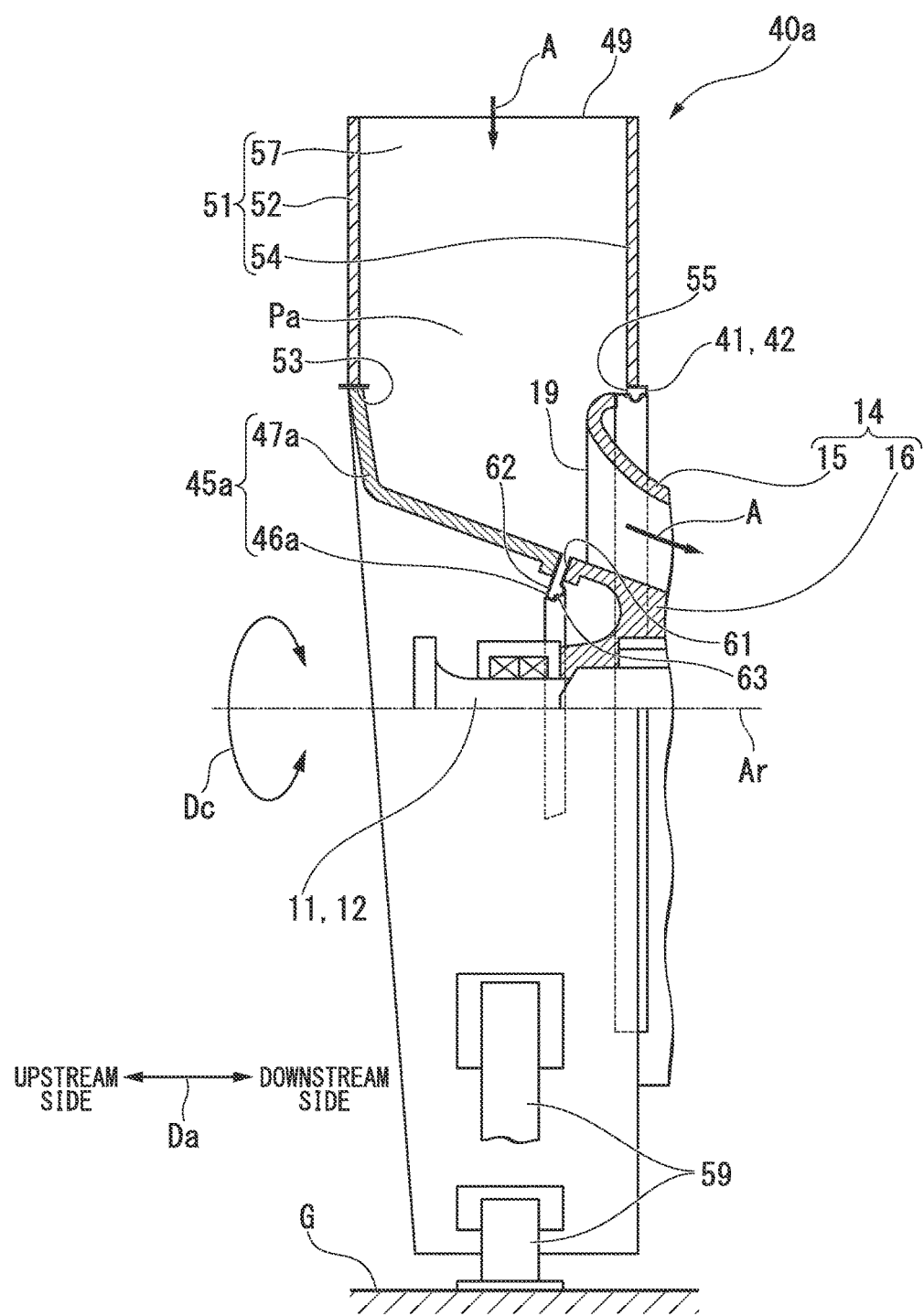
FIG. 6 is a cutaway side view of a major part of an intake duct in a first modified example of the first embodiment according to the present invention.

Next, a first modified example of the axial-flow rotary mechanical facility in the first embodiment will be described with reference to FIG. 6.

As with the axial-flow rotary mechanical facility of the first embodiment, an axial-flow rotary mechanical facility of this modified example is also a gas turbine facility. In the gas turbine facility of this modified example, the configuration of an intake duct 40a, which guides the air A to the intake opening 19 of the compressor 10, is different from the configuration of the intake duct 40 of the first embodiment, and the other portions are the same as in the first embodiment. Therefore, the configuration of this intake duct 40a will be mainly described below.

As with the intake duct 40 of the first embodiment, the intake duct 40a of this modified example also has the first connection part 41 connected at the end of the annular outer casing 15 of the compressor 10, a second connection part 45a connected at the end of the annular inner casing 16 of the compressor 10, and the duct main body part 51 connected with the first connection part 41 and the second connection part 45a. The first connection part 41 and the duct main body part 51 of this modified example are the same as in the first embodiment. On the other hand, the second connection part 45a of this modified example is somewhat different from that of the first embodiment.

As with the second connection part 45 of the first embodiment, the second connection part 45a of this modified example also has an inner cylinder 47a having a tubular shape around the axis Ar, and a second expansion joint 46a connected at the end of this inner cylinder 47a and having an annular shape around the axis Ar. The diameter of the inner cylinder 47a having a tubular shape around the axis Ar increases gradually toward the upstream side. In this modified example, the second expansion joint 46a is disposed between the downstream side of the tubular inner cylinder 47a and the upstream side of the inner casing 16 of the compressor 10. The first frame 61 of this second expansion joint 46a is rigidly connected at the upstream end of the inner casing 16 of the compressor 10, and the second frame 62 of the second expansion joint 46a is rigidly connected at the downstream end of the inner cylinder 47a. The other end of this inner cylinder 47a is rigidly connected with bolts and nuts at the edge of the circular opening 53 of the front wall plate 52 in the duct main body part 51. Alternatively, the other end of the inner cylinder 47a and the edge of the circular opening 53 of the front wall plate 52 may be rigidly connected with each other by welding etc.

The duct main body part 51 is supported from below by the plurality of intake duct support legs 59. The plurality of intake duct support legs 59 are fixed on the gas turbine installation surface G.

As in the first embodiment, the duct main body part 51 in this modified example is also supported from below by the plurality of intake duct legs 59.

Thus, in this modified example, the duct main body part 51 of the intake duct 40a and the inner cylinder 47a, which is rigidly connected with this duct main body part 51, are supported by the intake duct support legs 59, and the duct main body part 51 and the inner cylinder 47a are connected with the compressor casing 14 through the first expansion joint 42 and the second expansion joint 46a which allow movement of the duct main body part 51 and the inner cylinder 47a relative to the compressor casing 14. In this modified example, therefore, the end in the axial direction Da of the compressor casing 14 is substantially free of the weights of the duct main body part 51 and the inner cylinder 47a. Accordingly, in this modified example, it is possible to further increase the natural frequency of the compressor 10 and to further improve the vibration characteristics of the compressor 10 compared with the first embodiment.

The air A suctioned from the intake opening 49 of the intake duct 40a gradually increases in flow velocity and gradually decreases in static pressure in the course of flowing through the intake chamber inside the intake duct 40a and flowing into the compressor 10 from the suction opening 19 of the compressor 10. Accordingly, in the intake chamber of the intake duct 40a, the static pressure is lower in a portion closer to the suction opening 19 of the compressor 10, in other words, in a portion closer to the axis Ar, than in a portion farther away from the axis Ar. Thus, the pressure difference between the inside and the outside of the intake duct 40a is larger in a portion closer to the axis Ar than in a portion farther away from the axis Ar. As a result, the force acting from the outside toward the inside on a portion of the members forming the intake duct 40a which is closer to the axis Ar is larger than the force acting from the outside toward the inside on a portion farther away from the axis Ar.

Here, unlike in the first embodiment, the front wall plate 52 and the inner cylinder 47a in the duct main body part 51 are integrated in this modified example. In addition, the diameter of the second expansion joint 46a connected at the downstream end of the inner cylinder 47a is smaller than the diameter of the first expansion joint 42 connected at the edge of the circular opening 55 of the rear wall plate 54 in the duct main body part 51. Accordingly, in this modified example, the distance in the radial direction Dr from the intake opening 49 of the intake duct 40a to the second expansion joint 46a is larger than the distance in the radial direction Dr from the intake opening 49 of the intake duct 40a to the first expansion joint 42 by the difference between the maximum radius (radius at the upstream end) and the minimum radius (radius at the downstream end) of the inner cylinder 47a.

Thus, in this modified example, the force acting from the outside toward the inside on the members (=front wall plate 52+inner cylinder 47a) forming the portion from the intake opening 49 of the intake duct 40a to the second expansion joint 46a is larger than the force acting from the outside toward the inside on the member (=rear wall plate 54) forming the portion from the intake opening 49 of the intake duct 40a to the first expansion joint 42 by the force acting from the outside toward the inside on the inner cylinder 47a. This force acting from the outside toward the inside on the inner cylinder 47a acts in the axial direction Da, i.e., a direction in which the intake duct 40a is inclined. In this modified example, therefore, it is necessary that the intake duct support legs 59 are capable of receiving not only the weight of the intake duct 40a itself but also the force acting in the direction in which the intake duct 40a is inclined, as well as to enhance the rigidity of the duct main body part 51 and the inner cylinder 47a.

That is, in this modified example, compared with the first embodiment, the load applied to the end in the axial direction Da of the compressor casing 14 can be reduced, while the burden on the intake duct support legs 59, the duct main body part 51, and the inner cylinder 47a increases. Conversely, in the first embodiment, compared with this modified example, although the load applied to the end in the axial direction Da of the compressor casing 14 increases slightly, the burden on the intake duct support legs 59, the duct main body part 51, and the inner cylinder 47 can be reduced.

When selecting either the first embodiment or this modified example, therefore, it is preferable that merits and demerits of increase/decrease in the load applied to the end in the axial direction Da of the compressor casing 14, and merits and demerits of increase/decrease in the burden on the intake duct support legs 59, the duct main body part 51, and the inner cylinder 47a are weighed against each other.

In this modified example, intake duct support legs may be separately provided which are in contact with the front wall plate 52 and the rear wall plate 54 of the intake duct 40a and receive a force in the axial direction Da acting in the direction in which the intake duct 40a is inclined.

Second Modified Example of First Embodiment

Figure 7:
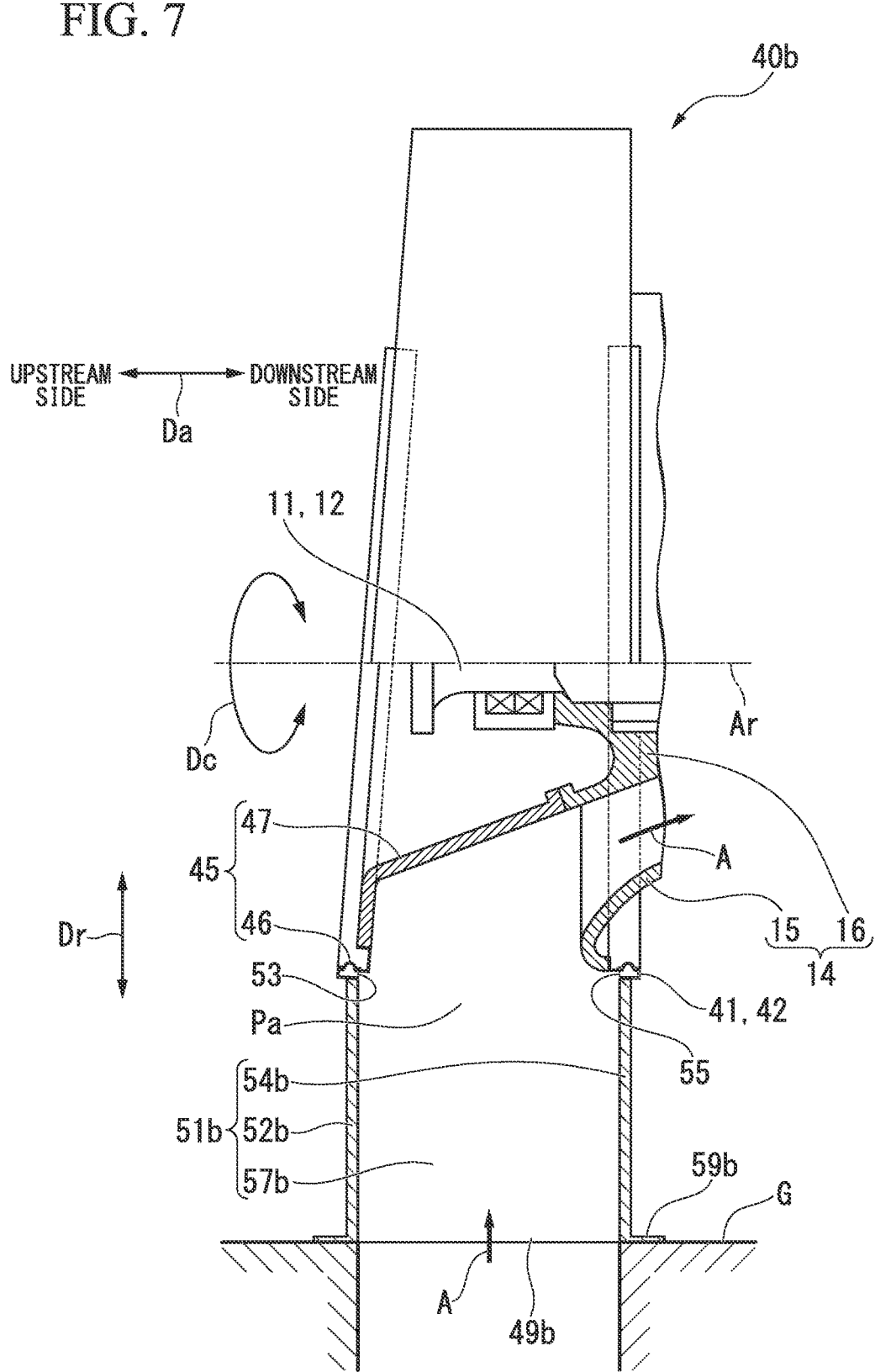
FIG. 7 is a cutaway side view of a major part of an intake duct in a second modified example of the first embodiment according to the present invention.

Next, a second modified example of the axial-flow rotary mechanical facility in the first embodiment will be described with reference to FIG. 7.

In the axial-flow rotary mechanical facility of this modified example, as with the axial-flow rotary mechanical facility of the first modified example, the configuration of an intake duct 40b is different from the configuration of the intake duct 40 of the first embodiment, and the other portions are basically the same as in the first embodiment. Therefore, the configuration of this intake duct 40b will be mainly described below.

The intake opening 49 of the intake duct 40 of the first embodiment is open upward. By contrast, an intake opening 49b of the intake duct 40b of this modified example is open downward. That is, the intake duct 40b of this modified example corresponds to the intake duct 40 of the first embodiment turned upside down. Accordingly, the gas turbine installation surface G of this modified example has an opening for the air A to pass through formed at a position below the intake duct 40b.

A flange (support part) 59b, which extends toward the outside, is formed at the edge of the intake opening 49b of a duct main body part 51b in the intake duct 40b of this modified example. This flange 59b is in contact with the gas turbine installation surface G and fixed on this gas turbine installation surface G. Thus, this flange 59b functions as a support part for supporting the intake duct 40b.

Thus, the intake opening of the intake duct may be open upward as in the first embodiment, may be open downward as in this modified example, or may be open sideward. In this modified example, as with the first modified example, the second expansion joint 46 may be disposed between the downstream side of the inner cylinder 47 and the upstream side of the inner casing 16 of the compressor 10.

Second Embodiment

Figure 8:
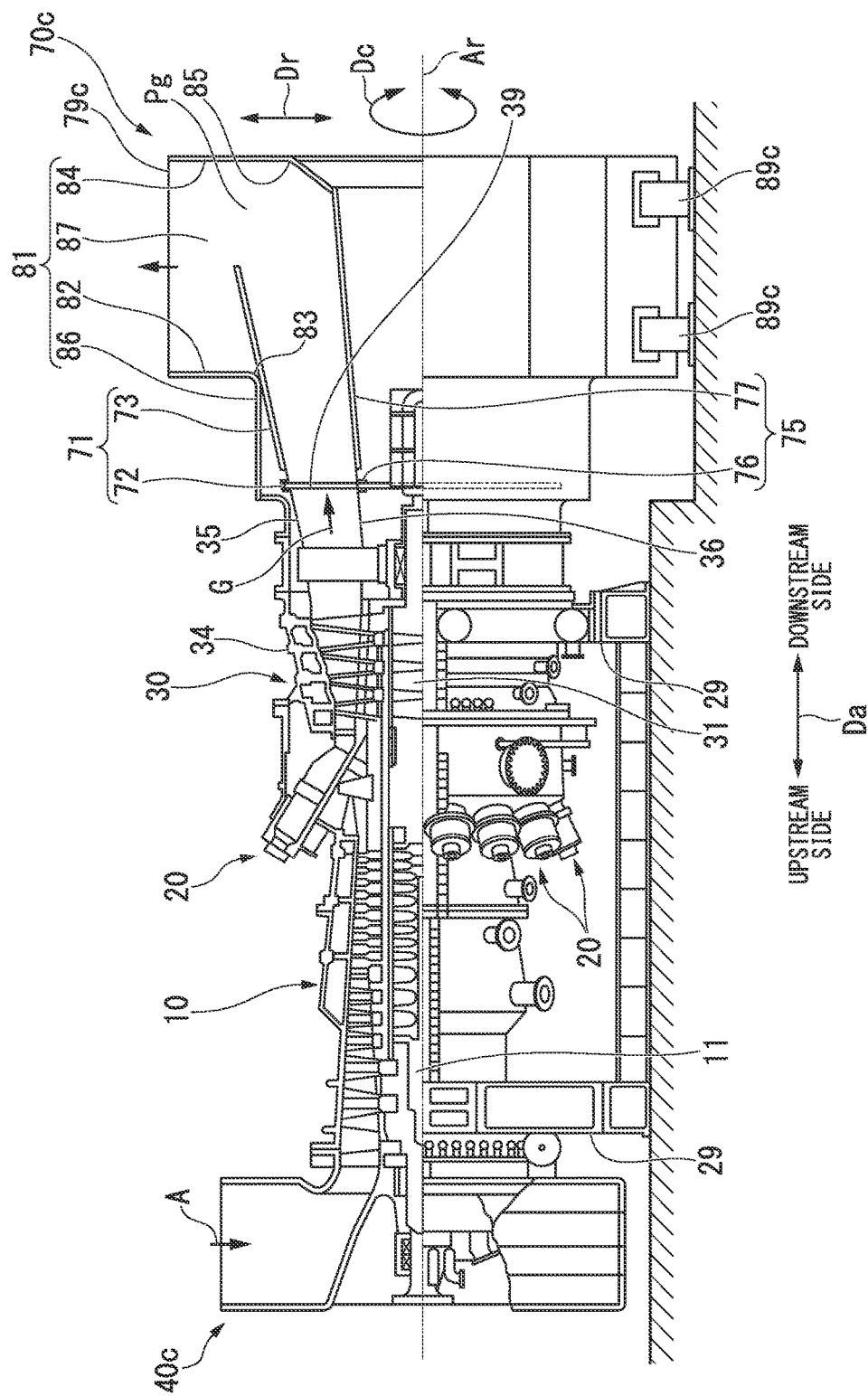
FIG. 8 is a cutaway side view of a major part of a gas turbine facility in a second embodiment according to the present invention.

Next, a second embodiment of an axial-flow rotary mechanical facility including the gas guiding device and the axial-flow rotary machine according to the present invention will be described with reference to FIG. 8.

As with the axial-flow rotary mechanical facility of the first embodiment, the axial-flow rotary mechanical facility of this embodiment is also a gas turbine facility. In the gas turbine facility of this embodiment, the configuration of an exhaust duct 70c which guides the combustion gas G from the turbine 30, which is one type of axial-flow rotary machines, as exhaust gas to the outside is different from the configuration of the exhaust duct 70 of the first embodiment, while the configurations of the compressor 10, the combustor 20, and the turbine 30 are the same as in the first embodiment. Therefore, the configuration of this exhaust duct 70c will be mainly described below.

The exhaust duct 70c of this embodiment has a first connection part 71 connected at the downstream end of the tubular outer diffuser (outer casing) 35 of the turbine 30, a second connection part 75 connected at the downstream end of the tubular inner diffuser (inner casing) 36 of the turbine 30, and a duct main body part 81 connected with the first connection part 71 and the second connection part 75.

The first connection part 71 has a first expansion joint 72 which is connected at the downstream end of the tubular outer diffuser 35 and has an annular shape around the axis Ar, and an outer cylinder 73 which is connected at the downstream end of the annular first expansion joint 72 and has a tubular shape around the axis Ar. The diameter of the outer cylinder 73 increases gradually toward the downstream side.

The second connection part 75 has a second expansion joint 76 which is connected at the downstream end of the tubular inner diffuser 36 and has an annular shape around the axis Ar, and an inner cylinder 77 which is connected at the downstream end of the annular second expansion joint 76 and has a tubular shape around the axis Ar. The diameter of the inner cylinder 77 increases gradually toward the downstream side.

As with the above-described first expansion joint 42 and second expansion joint 46, the first expansion joint 72 and the second expansion joint 76 in this embodiment also have a first frame and a second frame disposed at a distance from each other and an expansion member coupling the first frame and the second frame with each other. Both the first frame and the second frame are formed of rigid metal etc. The expansion member is formed mainly of a fluorine resin sheet. Both the first expansion joint 72 and the second expansion joint 76 come into contact with high-temperature combustion gas. In this embodiment, therefore, the expansion member has the sheet of fluorine resin, which is a highly heat-resistant resin, and an insulation material (not shown) disposed between this fluorine resin sheet and combustion gas. Alternatively, this expansion member may be a bellows formed of metal.

The duct main body part 81, along with the annular first connection part 71 and second connection part 75, forms therein an annular gas flow passage Pg. This gas flow passage Pg forms an exhaust chamber. On the radially outside of this duct main body part 81, an exhaust opening 79c which is open upward is formed.

The duct main body part 81 has a main body cylinder 86 which covers the outer peripheral side of an upstream-side portion of the first connection part 71 and is connected with the turbine casing 34, a front wall plate 82 and a rear wall plate 84 which extend in a direction including a directional component perpendicular to the axis Ar and face each other at a distance in the axial direction Da, and a side wall plate 87 which couples the radially outer edge of the front wall plate 82 and the radially outer edge of the rear wall plate 84. The front wall plate 82 is located on the upstream side relative to the rear wall plate 84. The upper edges of the radially outer edge of the front wall plate 82 and the radially outer edge of the rear wall plate 84 are not coupled by the side wall plate 87, and the exhaust opening 79c is formed by these upper edges and the upper edge of the side wall plate 87. In the front wall plate 82 and the rear wall plate 84, openings 83, 85 which are circular around the axis Ar are formed. The downstream end of the main body cylinder 86 and the outer cylinder 73 of the first connection part 71 are rigidly connected at the edge of the circular opening 83 of the front wall plate 82. The downstream end of the inner cylinder 77 of the second connection part 75 is rigidly connected at the edge of the circular opening 85 of the rear wall plate 84.

The duct main body part 81 is supported from below by a plurality of exhaust duct support legs (support parts) 89c. The plurality of exhaust duct support legs 89c are fixed on the gas turbine installation surface G.

In this embodiment, the gas guiding device is composed of the exhaust duct 70c and the exhaust duct support legs 89c having been described above.

Thus, in this embodiment, the duct main body part 81 of the exhaust duct 70c, the outer cylinder 73 of the first connection part 71, and the inner cylinder 77 of the second connection part 75 are supported by the exhaust duct support legs 89c, and the duct main body part 81, the outer cylinder 73 of the first connection part 71, and the inner cylinder 77 of the second connection part 75 are connected with the turbine 30 through the first expansion joint 72 and the second expansion joint 76 which allow movement of the duct main body part 81, the outer cylinder 73 of the first connection part 71, and the inner cylinder 77 of the second connection part 75 relative to the turbine 30. In this embodiment, therefore, the downstream end in the axial direction Da of the turbine 30 is substantially free of the loads of the duct main body part 81, the outer cylinder 73 of the first connection part 71, and the inner cylinder 77 of the second connection part 75. Accordingly, in this embodiment, the natural frequency of the gas turbine as a whole can be increased, and the vibration characteristics of the gas turbine as a whole can be improved.

While the first expansion joint 72 is located at the upstream end of the first connection part 71 in this embodiment, this first expansion joint 72 may be located in another portion of the first connection part 71. Moreover, while the second expansion joint 76 is located at the upstream end of the second connection part 75 in this embodiment, this second expansion joint 76 may be located at another portion of the second connection part 75.

While the exhaust opening 79c of the exhaust duct 70c is open upward in this embodiment, the exhaust opening 79c may be open downward or sideward.

In this embodiment, any one of the intake ducts of the first embodiment and its modified examples may be adopted as the intake duct 40c.

While the expansion joint is adopted as the joint in the embodiments and the modified examples described above, any joint, for example, a movable pipe joint other than an expansion joint, may be adopted as long as the joint connects two members so as to allow relative movement of these two members.

In the above embodiments and modified examples, the gas guiding device for the axial-flow compressor 10 in the gas turbine facility or the turbine 30 in the gas turbine facility has been taken as an example. However, the present invention is not limited to this example, and the present invention may be applied to an axial-flow rotary machine such as an axial-flow compressor which does not constitute a part of a gas turbine facility.

INDUSTRIAL APPLICABILITY

According to one aspect of the present invention, it is possible to improve vibration characteristics of an axial-flow rotary machine while guiding gas between a gas guiding device and the axial-flow rotary machine.

REFERENCE SIGNS LIST

10 Compressor
11 Compressor rotor
12 Rotating shaft
14 Compressor casing
15 Outer casing
16 Inner casing
20 Combustor
30 Turbine
31 Turbine rotor
32 Rotating shaft
34 Turbine casing
35 Outer diffuser (outer casing)
36 Inner diffuser (inner casing)
39 Exhaust port
40, 40a, 40b, 40c Intake duct
41 First connection part
42 First expansion joint (expansion joint or joint)
45, 45a Second connection part
46, 46a Second expansion joint (expansion joint or joint)
47, 47a Inner cylinder
49, 49b Intake opening
51, 51b Duct main body (main body part)
52, 52b Front wall plate
54, 54b Rear wall plate
57, 57b Side wall plate
59 Intake duct support leg (support part)
59b Flange (support part)
70, 70c Exhaust duct
71 First connection part
72 First expansion joint (expansion joint or joint)
73 Outer cylinder
75 Second connection part
76 Second expansion joint (expansion joint or joint)
77 Inner cylinder
79, 79c Exhaust opening
81 Duct main body (main body part)
82 Front wall plate
84 Rear wall plate
86 Main body cylinder
87 Side wall plate
89, 89c Exhaust duct support leg (support part)

The invention claimed is:

1. A gas guiding device which is connected to an axial-flow rotary machine supported by at least one support leg, the axial-flow rotary machine including a rotating shaft rotating around an axis, an inner casing having a tubular shape around the axis, and an outer casing having a tubular shape around the axis and forming a gas flow passage for gas between the outer casing and an outer peripheral side of the inner casing, and which guides the gas between the gas guiding device and the axial-flow rotary machine, the gas guiding device comprising:
- a first connection part connected at an end of the tubular outer casing and having an annular shape around the axis;
- a second connection part connected at an end of the tubular inner casing and having an annular shape around the axis;
- a first wall plate connected to the first connection part;
- a second wall plate connected to the second connection part;
- side wall plates that couple the first wall plate and the second wall plate;
- a main body part configured of the first wall plate, the second wall plate, and the side wall plates, the main body part having an opening formed on the radially outside relative to the axis; and
- a support part supporting the main body part, wherein
- the first connection part has a first joint which has an annular shape around the axis and allows movement of the main body part relative to the outer casing,
- the second connection part has a second joint which has an annular shape around the axis and allows movement of the main body part relative to the inner casing,
- a flow passage having an annular shape around the axis is provided inside the main body part by a combination of the first connection part and the second connection part, and
- the support part supporting the main body part is configured to support the main body part independently from the axial-flow rotary machine.

2. The gas guiding device according to claim 1, wherein the diameter of the annular first joint and the diameter of the annular second joint are equal.

3. The gas guiding device according to claim 1, wherein both the first joint and the second joint are an expansion joint.

4. The gas guiding device according to claim 1, wherein the opening of the main body part is open upward.

5. The gas guiding device according to claim 1, wherein the opening of the main body part is open downward.

6. The gas guiding device according to claim 1, wherein the first connection part, the second connection part, and the main body part constitute an intake duct which is provided on an intake side of the axial-flow rotary machine, while the opening of the main body part forms an intake opening.

7. The gas guiding device according to claim 1, wherein the first connection part, the second connection part, and the main body part constitute an exhaust duct which is provided on an exhaust side of the axial-flow rotary machine, while the opening of the main body part forms an exhaust opening.

8. An axial-flow rotary mechanical facility comprising:
the gas guiding device according to claim 1; and
the axial-flow rotary machine.

9. A gas turbine facility comprising:
the gas guiding device according to claim 1; and
a gas turbine which is the axial-flow rotary machine.

* * * * *